United States Patent [19]
Becker

[11] 3,724,885
[45] Apr. 3, 1973

[54] LOCKING DEVICE FOR EXTENSIBLE TUBES

[76] Inventor: Gordon D. Becker, Rt. 1, Larsen, Wis. 54947

[22] Filed: Jan. 7, 1972

[21] Appl. No.: 216,142

[52] U.S. Cl............................287/58 CT, 248/188.5
[51] Int. Cl.................................................F16b 7/14
[58] Field of Search...287/58 CT, DIG. 8; 248/188.5, 248/412, 161

[56] References Cited

UNITED STATES PATENTS

| | | | |
|---|---|---|---|
| 2,546,157 | 3/1951 | Hume | 287/58 CT |
| 2,546,299 | 3/1951 | DuMais | 287/58 CT X |
| 2,256,248 | 9/1941 | Hansen | 287/58 CT |

Primary Examiner—Andrew V. Kundrat
Attorney—S. L. Wheeler

[57] ABSTRACT

Elastomeric annular parts preferably made of synthetic resin such as nylon include at least two sleeves which are eccentrically interlocked and relatively rotatable to develop torque which effects lateral binding pressure to lock together telescopically associated tubes engaged with such parts, whereby two tubes may be fixed in different over-all lengths.

The same principle is applied in an alternative embodiment to tubes which have annular collars to effect the lock but are themselves square or rectangular in cross section.

2 Claims, 5 Drawing Figures

PATENTED APR 3 1973  3,724,885
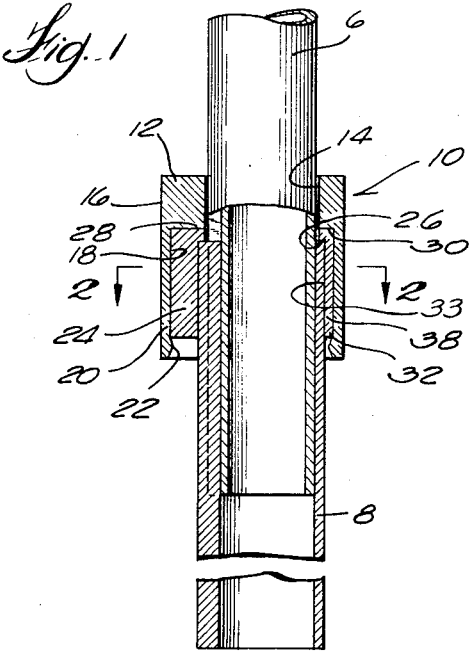
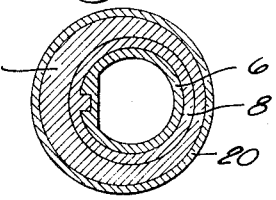
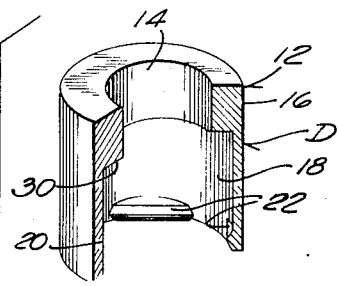
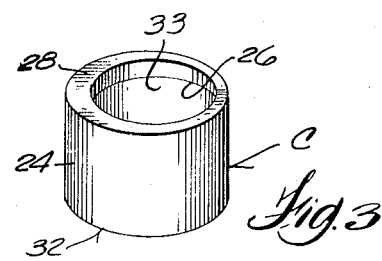
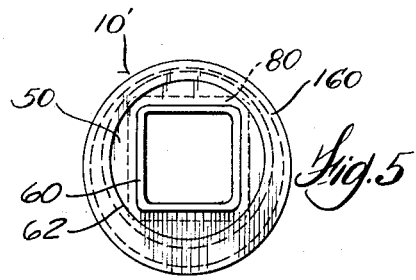
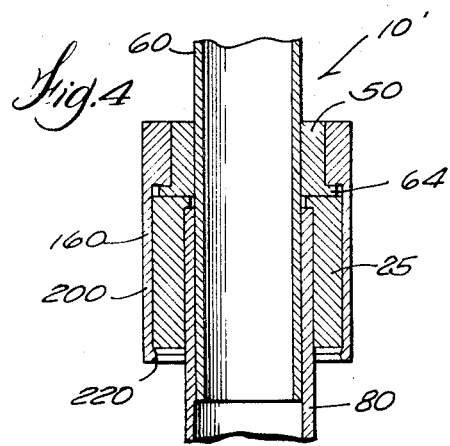
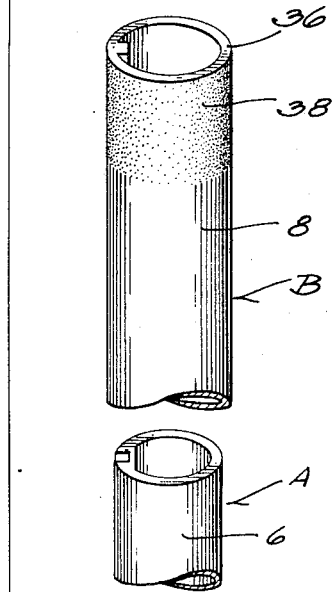

LOCKING DEVICE FOR EXTENSIBLE TUBES

BACKGROUND OF THE INVENTION

The device is old in principle in U.S. Pat. to Hume No. 2,546,157, and other patents, but is novel in detail.

SUMMARY OF THE INVENTION

An important feature of the invention is the fact that the eccentrically telescoped parts are made of an elastomeric synthetic resin whereby they can be bound together securely with less pressure and released more readily than as if made of metal and can be used indefinitely without either abrasion or corrosion and are resiliently yieldable to facilitate assembly while presenting a smooth external margin. The sleeve comprises a deformable rib about the margin of the interior cavity in which the collar is retained, the sleeve having a cavity with said rib at one end thereof and the shoulder at the other, the length of the collar being substantially equal to the space between the shoulder and the rib so that there is little or no reciprocative movement of the collar across the cavity (since such movement might damage the device).

BRIEF DESCRIPTION OF DRAWINGS

FIG. 1 is a fragmentary detail view partially in side elevation and partially in section of an eccentric locking device embodying the invention.

FIG. 2 is a view in cross section of the device shown in FIG. 1.

FIG. 3 is a view showing in perspective the separated component parts of the lock shown in FIG. 1 and FIG. 2.

FIG. 4 shows a modified embodiment in longitudinal section.

FIG. 5 shows a cross sectional view through the device of FIG. 4 in a transverse plane comparable to that of FIG. 2.

DETAILED DESCRIPTION

A telescoping support comprises inner tube or pole A and outer tube B held in a desired position of longitudinal adjustment by a locking device designated by reference character 10. While the inner part 6 is shown to be tubular, it will be understood that this is not an essential, since it may constitute a solid rod or bar, as well as a tube.

The locking device 10 comprises a collar 12 (also D in FIG. 3) having a hole 14 which is eccentrically located with reference to its outer cylindrical surface 16. The hole 14 is circular in cross section and fits the tube 6 (which in FIG. 3 is one of the elements A to be locked). Within the collar 12 is a recess 18 concentric with reference to the external surface 16 of the collar and eccentric to the hole 14. Surrounding the recess 18 is a skirt 20 encircled along its interior lower margin with one or more cam flanges 22 which may be continuous or discontinuous. The elastomeric resin from which the collar 12 is made enables the skirt 20 to be forced over the inner sleeve 24 (also marked C in FIG. 3), its ensuing expansion holding the sleeve in assembly in collar 12, as shown in FIG. 1. The length of sleeve 24 is substantially equal to the space between shoulder 30 and cam 22. When the upper end of tube 8 is passed through the inner sleeve 24, its end 36 abuts the shoulder 26 at the upper end of recess 33, the assembly being maintained by engagement of the camming rib 22 beneath the lower margin 32 of the inner sleeve. If the camming rib 22 or 220 is continuous as shown in FIG. 1 and FIG. 4, it completely closes the space beneath the sleeve 24, not only improving the appearance but, also, tending to exclude grit.

The device requires for its operation the manually effected relative rotation of the external collar 12 (D) with reference to the internal sleeve 24 (C) which is not directly accessible. Instead of providing splines for communicating motion from tube 8 to sleeve 24, it is preferred to use adhesive 38 on the upper area of tube 8 or to give sleeve 24 a pressed fit on the upper end of the tube. When the assembly is completed as shown in FIG. 1 and the tubes 6 and 8 are adjusted telescopically to any desired relative length, the appliction of light manual torque to rotate collar 16 (D) somewhat with respect to the inner sleeve 24 (c) will cause the relative displacement of these parts. The resulting binding effect of the eccentric collar and sleeve locks the tubes securely against further axial movement.

For most purposes, it is desirable that very light manual torque unlock as well as lock tubes 6 and 8 against relative movement. If, in special circumstances, this is undesirable, motion communicating means other than adhesive or pressed fit is used.

In the foregoing embodiment of the invention, the operation depends in part on the fact that the relatively adjustable tubes are circular in cross section. If they are not circular in cross section, they can accomplish similar locking functions by a lock 10' (FIG. 4) which requires no splines, the components being locked in an ultimately similar manner by virtue of their non-circular form. Thus the inner tube 60 is square in cross section as shown in FIG. 5. The outer tube 80 is also a square (at least interiorly) to fit that cross section and to telescope outside of tube 60 as shown in FIG. 4. The adaptor 50 likewise telescopes outside of tube 60, having a square interior cross section. Outwardly, however, the adaptor 50 has a circular periphery at 62 and a flange 64 to seat on the collar 25. The collar 160 is shouldered to house the adaptor flange 64 and has its skirt portion 200 provided with a wedge rib 220 which maintains the assembly.

With the square cross section tubes 60 and 80 telescoped together to any desired extent, the operator twists the collar 160 exactly as previously described. Relative rotation between the eccentrically circular parts 25 and 160 brings about an offset which locks the telescopically extending tubes together against displacement. In either case, the tubes are released by reversely twisting the parts which brought about their locking engagement.

The device herein disclosed can be used wherever it is desirable to provide for the telescopic adjustment of a tube or pole. Specific examples are the leg of a tripod; a telescopic tent pole; a telescopic post for use in hospitals to support bottles of plasma, etc. In all cases, the adjustment is maintained and released by relative rotation of sleeves mounted upon the telescoping parts and having eccentric surfaces bearing on the telescopically adjustable pole sections. The purpose of the square tubing or splined tubing is to prevent accidentally releasing the locking mechanism by turning the tubing. An example would be a stand such as used in a hospital. Bumping one or the other end of the cross bar could turn the inner tube 6 and accidentally release the lock. (Turning tube 6 carries collar 12 with it and releases the lock) While the pole sections may be made of metal, the eccentrically related sleeves which accomplish the locking are preferably made of synthetic resin. This gives superior results, not only in original assembly due to the yieldability of the camming flanges, but also because of the lubricity of the material which contributes to the smoothness of operation and freedom from scratching achieved when the device is made as herein disclosed.

I claim:

1. A locking device for exerting lateral binding pressure on telescopically related parts to hold them in adjustment, said device comprising a collar rotatably mounted on one of said parts, a sleeve non-rotatably mounted on the other of said parts and housed within the collar, the sleeve and collar having holes in which said parts are rotatably disposed and which are off-center in the collar, the collar having a skirt portion provided about its lower margin with an arcuate camming rib past which the sleeve can be forced and the material of which has sufficient memory resilience to automatically resume its position for retention of the sleeve within the collar after deformation by said sleeve.

2. A combination according to claim 1 in which said telescopically associated parts are complementarily non-circular and axially slideable in adjustment with each other, the said collar comprising a bearing portion internally complementary to external faces of the inner of said parts, said bearing portion having an outer face in bearing engagement with said collar and rotatable within the inner periphery of said collar.

* * * * *